Dec. 25, 1962 W. W. KENNEDY 3,070,346
FLOW CONTROL DAMPER
Filed April 27, 1960 5 Sheets-Sheet 1

INVENTOR.
WALTER W. KENNEDY
BY
ATTORNEYS

Dec. 25, 1962 — W. W. KENNEDY — 3,070,346
FLOW CONTROL DAMPER
Filed April 27, 1960 — 5 Sheets-Sheet 2
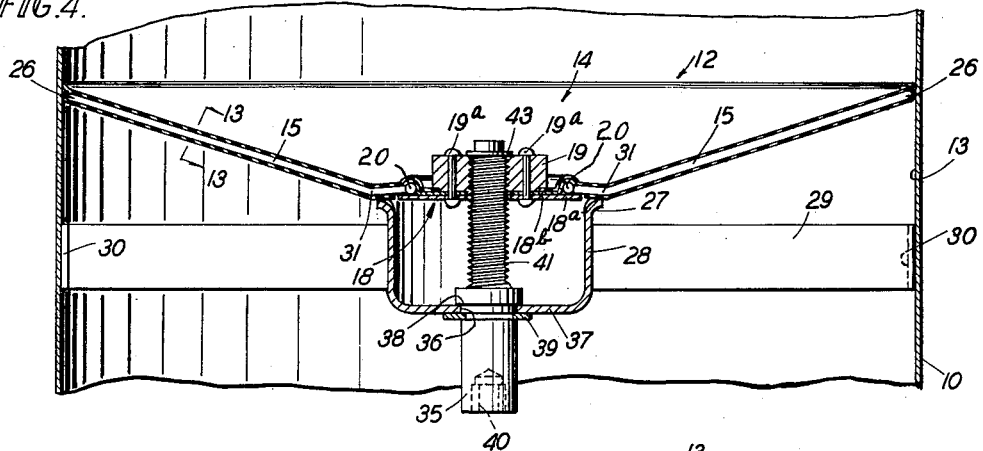
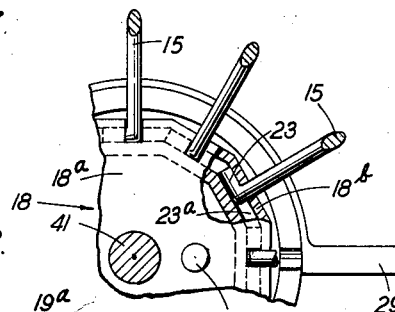
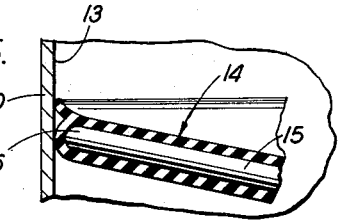
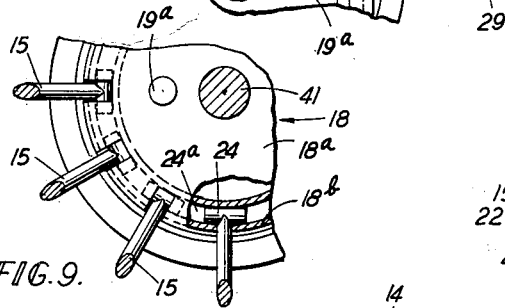
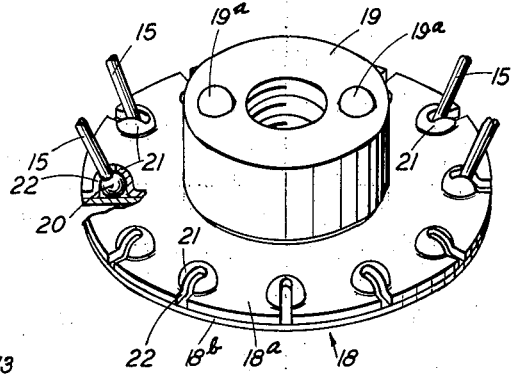
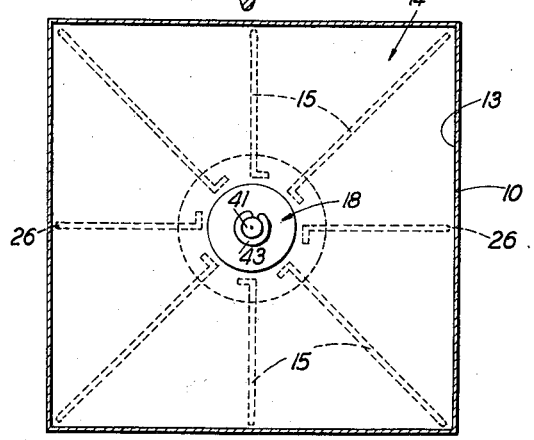
INVENTOR.
WALTER W. KENNEDY
BY
Carlson, Pitzner, Hubbard & Wolf
ATTORNEYS

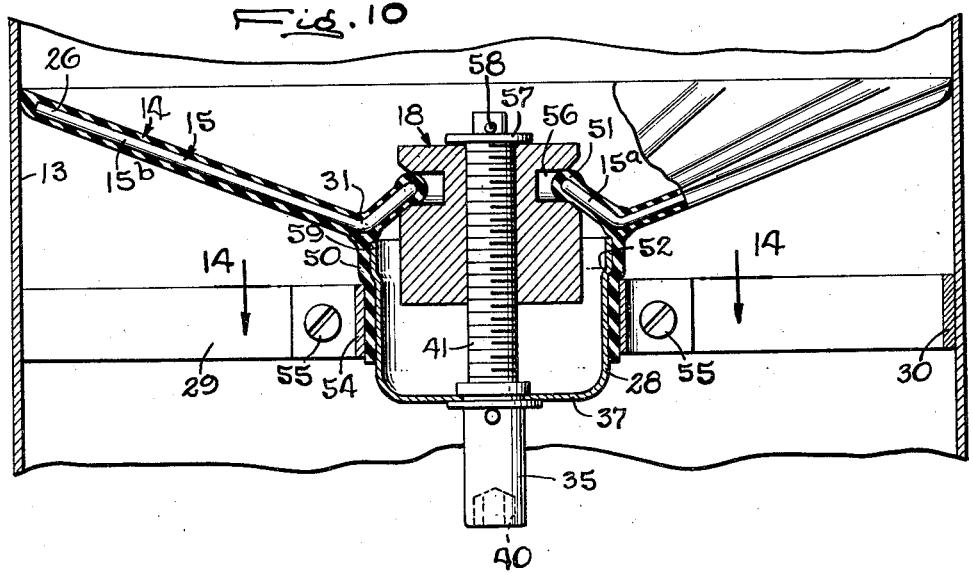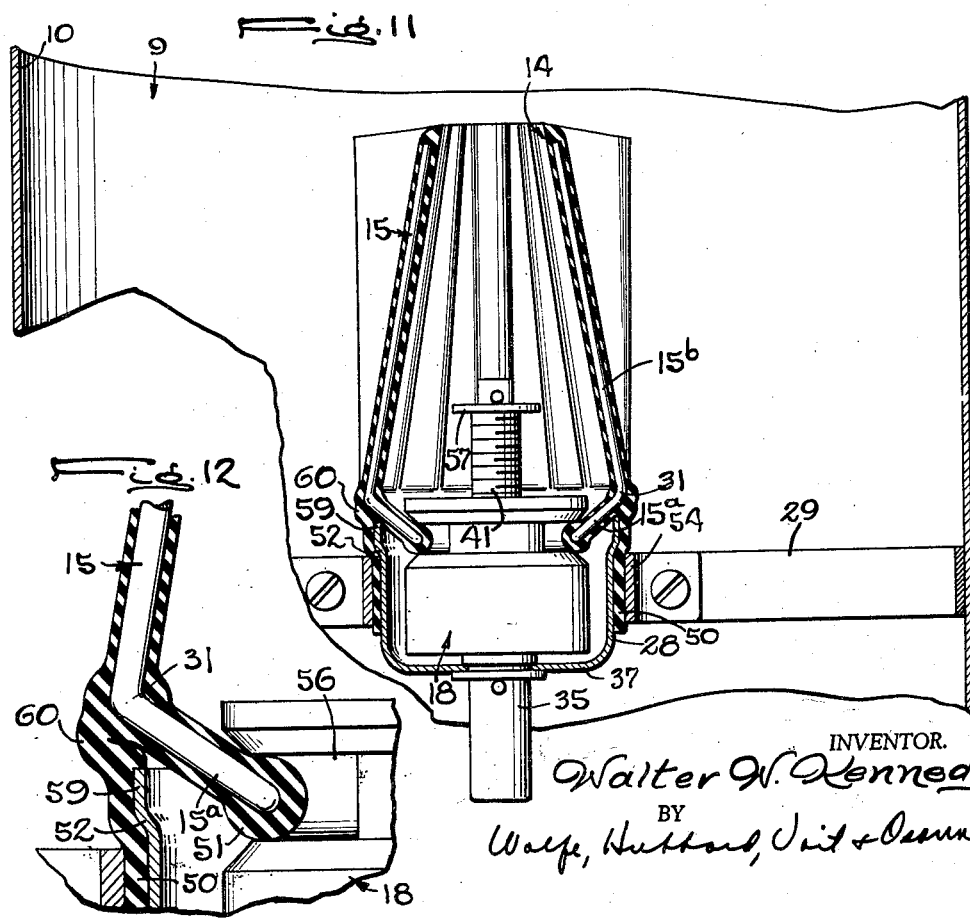

Dec. 25, 1962 W. W. KENNEDY 3,070,346
FLOW CONTROL DAMPER
Filed April 27, 1960 5 Sheets-Sheet 4
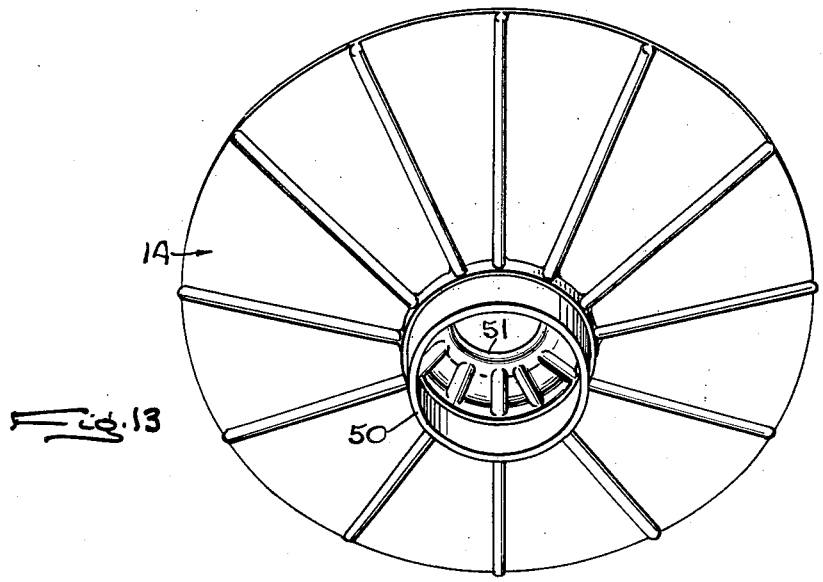
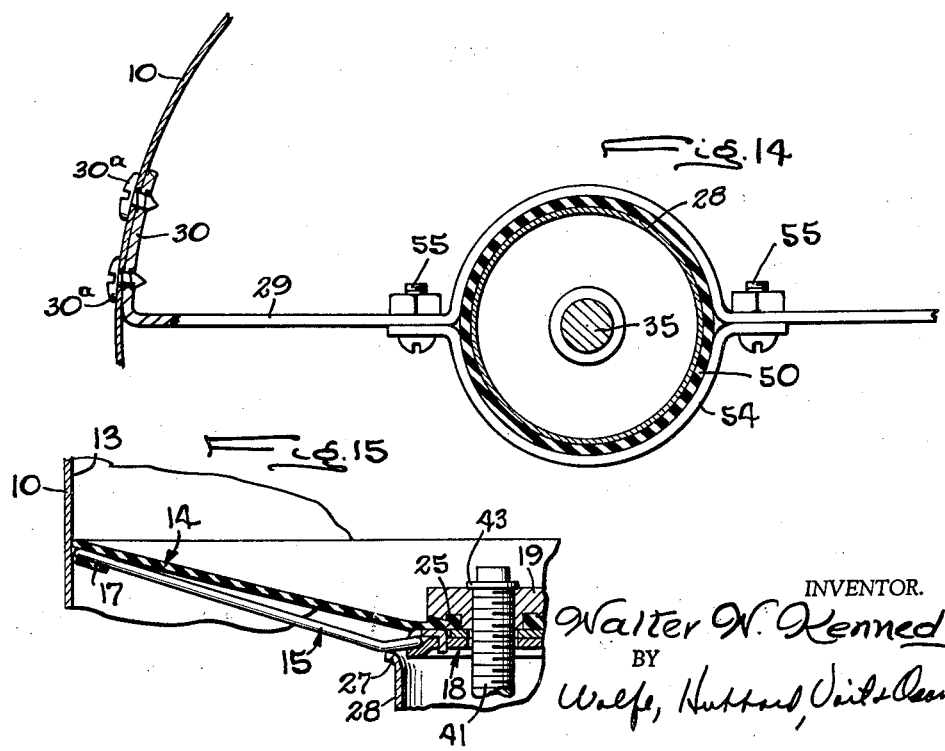
INVENTOR.
Walter W. Kennedy
BY
Wolfe, Hubbard, Voit & Osann Dec. 25, 1962   W. W. KENNEDY   3,070,346
FLOW CONTROL DAMPER
Filed April 27, 1960   5 Sheets-Sheet 5
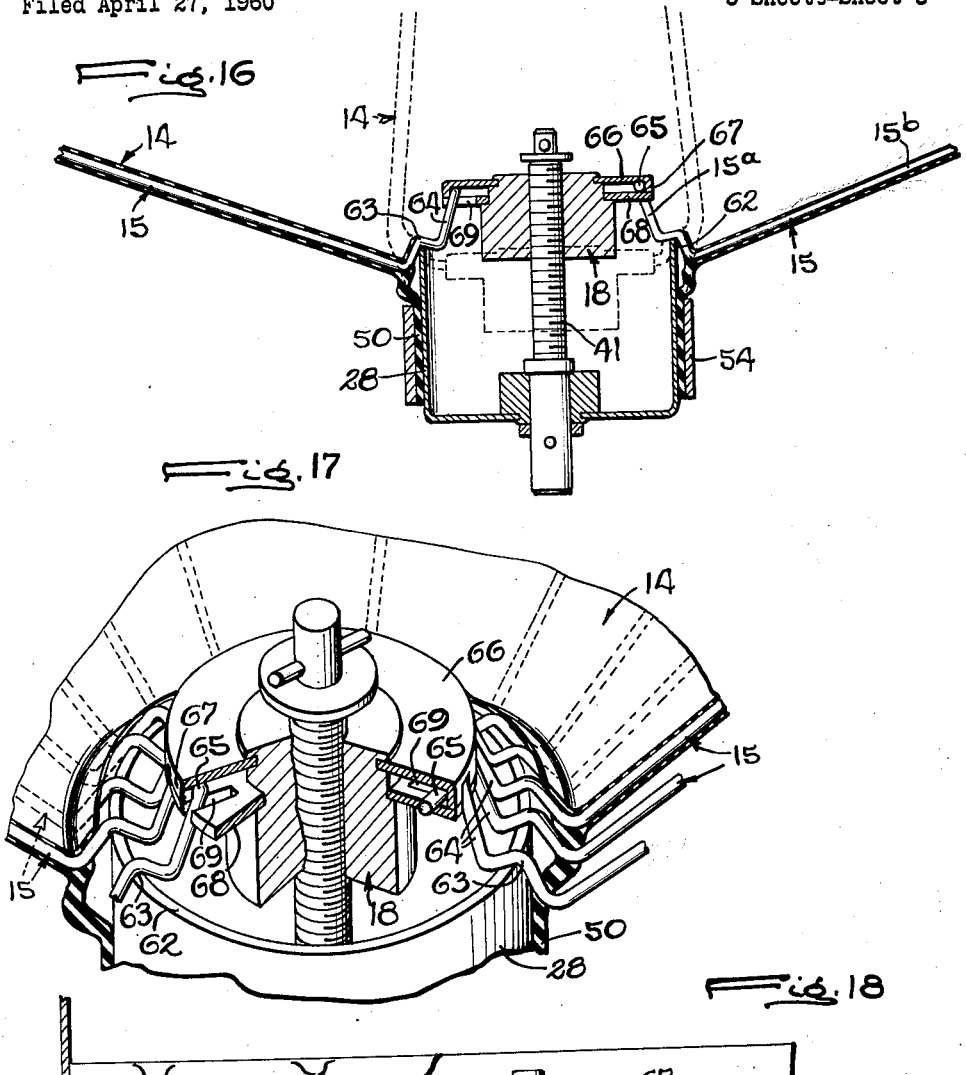
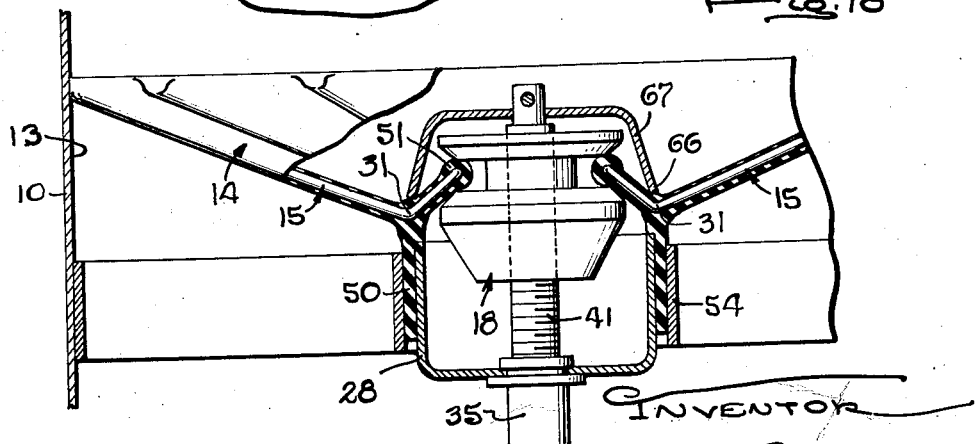
INVENTOR
Walter W. Kennedy
By Wolfe, Hubbard, Voit & Osann
ATTORNEY United States Patent Office 3,070,346
Patented Dec. 25, 1962

1

3,070,346
FLOW CONTROL DAMPER
Walter W. Kennedy, Rockford, Ill., assignor to Barber-Colman Company, Rockford, Ill., a corporation of Illinois
Filed Apr. 27, 1960, Ser. No. 25,152
12 Claims. (Cl. 251—266)

This invention relates to a damper for selectively regulating the volume of air or other gas flowing through a duct by adjusting the area of a passage defined between the damper and the internal wall of the duct.

The general object is to provide a damper of the above character which, as compared to prior constructions, is simpler and less costly in construction, is adaptable to a wider range of duct sizes without alteration, is adjustable from an operating point within the duct, and is quieter in operation and more effective in sealing the duct fully closed.

A more detailed object is to provide a damper in the form of an expansible cone or umbrella disposed within and extending axially of a duct and adjustable selectively to different diameters to close the duct or to vary the area of the annular passage around the interior of the duct wall.

Another object is to utilize the force of the air stream advancing through the duct to maintain the umbrella open and provide at least part of the sealing pressure when the damper is fully expanded against the duct wall.

A further object is to provide a damper which is resiliently expansible and contractible in response to changes in the pressure of the oncoming air stream and thus adapted to perform the additional function of an automatic flow regulator.

Still another object is to allow for free expansion of the air across the full area of the duct downstream from the umbrella.

A further object is to open and close the umbrella by a novel actuator which is accessible from the open end of the duct.

Still another object is to expand and collapse the umbrella in a novel manner through a simple screw and nut mechanism.

The invention also resides in the novel manner of defining the fulcrums of the umbrella ribs and actuating the same to open and close the umbrella.

Other objects and advantages of the invention will become apparent from the following detailed description taken in connection with the accompanying drawings, in which:

FIGS. 2 and 4 are similar views with the damper fully open and closed and in each instance shown in diametrical section.

FIG. 5 is an enlarged fragmentary and diametrical section of the fully closed damper.

FIG. 6 is a fragmentary perspective view of one type of mounting for the damper ribs.

FIGS. 7 and 8 are fragmentary views partially in section of modified mountings for the damper ribs.

FIG. 9 is an end view of the damper in a duct of square cross section.

FIG. 10 is a view similar to FIG. 4 of a modified and preferred form of the improved damper.

FIG. 11 is an enlarged fragmentary sectional view of the modified damper fully open.

FIG. 12 is a part of FIG. 11 on an enlarged scale.

2

FIG. 13 is a perspective view of the molded part of the damper shown in FIG. 10.

FIG. 14 is a fragmentary section taken along the line 14—14 of FIG. 10.

FIG. 15 is a fragmentary view similar to FIG. 4 of another modification.

FIG. 16 is a view similar to FIG. 4 showing still another modification.

FIG. 17 is a fragmentary perspective view of a part of FIG. 16.

FIG. 18 is a fragmentary view showing part of FIG. 16 incorporating a modification.

Figure 1:
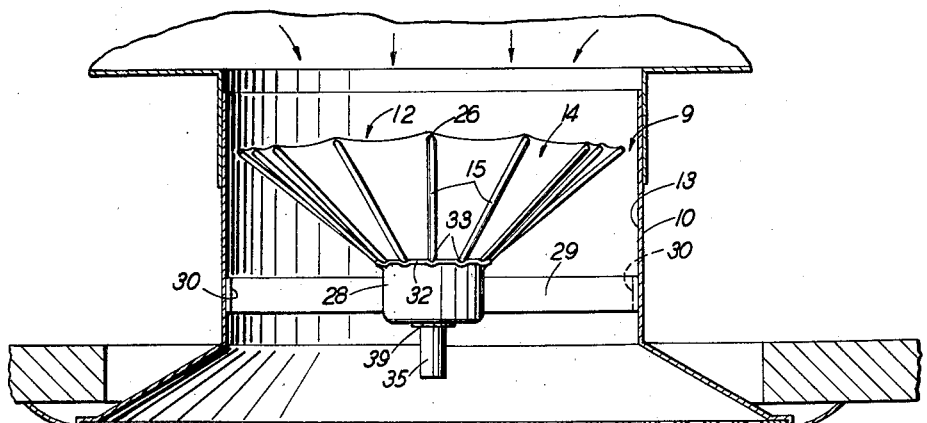
FIGURE 1 is a fragmentary sectional view of the outlet end of an air duct equipped with a damper embodying the novel features of the present invention.

The improved damper is intended for use in varying the radial width of an annular or ringlike passage 9 around the internal wall of a ring, collar, or tube 10 hereinafter referred to as a duct. The latter may be circular in cross section as shown in FIG. 1, rectangular as shown in FIG. 9, or of any other desired shape and of any length. Usually, such dampers are disposed adjacent the discharge end of the duct which may be covered by a suitable grill such as a perforated plate 11 removably mounted at the duct end.

Generally stated, the invention contemplates the use of a damper in the form of an umbrella or conical frustum correlated in size and shape with the internal cross section of the duct 10 and mounted within the latter with the axis lying along and preferably coincident with the duct axis so that by expanding and collapsing the cone radially, the duct may be closed tightly (FIG. 4) or partially opened to any desired degree (FIGS. 1 and 2) for regulating the flow of air or other gas through the duct in the direction indicated by the arrows. Usually, it is desirable to face the apex of the umbrella downstream so that the pressure of the oncoming air on the dished side assists in holding the umbrella open and in sealing the periphery thereof against the internal wall 13 of the duct when the umbrella is fully expanded (FIG. 4).

The umbrella comprises an imperforate conical disk 14 of flexible material such as rubber or plastic corresponding in peripheral shape to the duct cross section and at least as large as the latter when expanded fully. The disk is secured to relatively rigid ribs 15 angularly spaced apart to permit inward folding of the disk areas intervening between the ribs as indicated at 16 in FIG. 3. In the form shown in FIGS. 1 to 9, the ribs comprise substantially straight lengths of wire whose outer ends 26 preferably terminate just short of the disk periphery as shown in FIG. 5.

When formed of rubber, the disk 14 is preferably molded to the desired dished or frusto-conical shape which it takes when the umbrella is fully open as shown in FIG. 4. The rubber is usually about .040 of an inch thick and the ribs 15 are embedded in the rubber in the molding operation, preferably on the downstream side of the cone. As shown in FIG. 15, the disk may be formed separately with eyes 17 on the back or near the outer edge of the disk for insertion of the outer end portions of the ribs 15 therethrough.

Considering now the forms shown in FIGS. 1 to 9, the disk 14 is apertured at its center and the inner edge is suitably secured to a ring 18 defining the apex of the umbrella and mounted for movement back and forth along the duct axis to open and close the umbrella. In FIGS. 1 to 6, the ring is made in two abutting plates 18a and 18b with the disk 14 covering the plate 18a and underlying a hub 19 clamped against the ring 18 as by rivets 19a.

At their inner ends, the ribs 15 are pivotally coupled to the ring 18 to swing about tangentially disposed axes spaced outwardly from the duct axis. This is accomplished (FIGS. 1 to 6) by ball and socket joints formed by enlargements 20 on the inner ends of the ribs seated in sockets defined by angularly spaced rounded bosses 21 stamped in the plate 18ª and cooperating with the opposed flat face of the plate 18ᵇ. Each boss 21 is slotted radially as indicated at 22 to receive the rib 15 and permit the desired range of swinging of the latter in radial planes equidistantly spaced around the duct axis.

Instead of employing ball and socket joints, the ribs may be formed with L-shaped heads 23 at their inner ends (FIG. 7) or with T-shaped heads 24 (FIG. 8) disposed in suitably shaped sockets 23ª and 24ª formed in the opposed surfaces of the plates 18ª and 18ᵇ. Also the clamping of the disk 14 to the ring 18 may be effected through the medium of a bead 25 molded around the inner edge of the rubber disk 14 as shown in FIG. 15.

The ribs 15 act as levers in opening and closing the umbrella in response to axial movements of the actuator ring 18. This is accomplished by fulcruming each rib between its ends and near its inner end to swing about a tangentially disposed axis. In FIGS. 1 to 9, these fulcrums are defined by a second ring 27 larger than the ring 18 and axially fixed within the duct. Preferably, the ring 27 comprises the open end portion of a generally cylindrical cup 28 secured as by welding to the curved central part of a crossbar 29 extending diametrically across the duct. Laterally bent ends 30 of the crossbar are secured as by sheet metal screws 30ª (FIG. 14) to the duct wall 13 with the cup and duct axes substantially coinciding.

Figure 2:
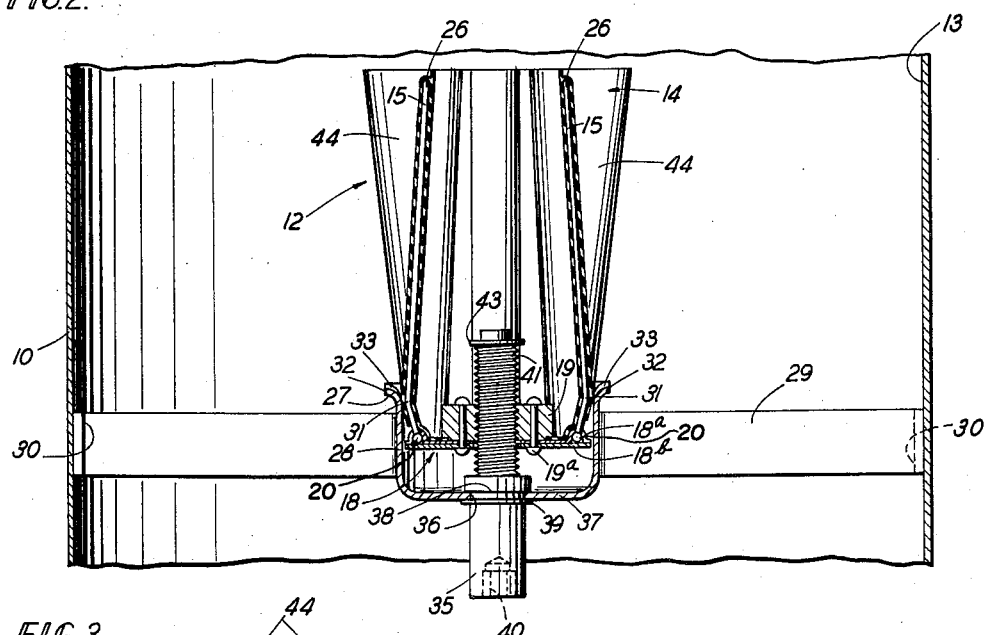
Figure 3:
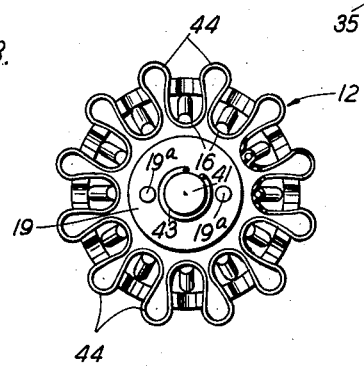
FIG. 3 is a plan view of the damper fully opened as shown in FIG. 2.

To enable the ribs 15 to be swung inwardly to positions (FIG. 2) substantially parallel to the duct axis, the ribs are bent adjacent their inner ends as indicated at 31 to provide fulcrum points which, in the fully open position of the damper, bear against the outer end of the cylindrical internal wall of the cup 28 as shown in FIG. 2. Herein, the fulcrum points on the ribs 15 are disposed in notches 33 angularly spaced around the cup lip 32 which is flared outwardly to curve the bottoms of the notches along which the fulcrum points shift as the umbrella is being opened and closed. In the open position (FIG. 3), the actuator ring 18 is axially spaced inwardly from the open end of the cup with the fulcrums of the ribs engaging the cup lip at the inner edges of the notch bottoms. When the damper is fully open (FIGS. 1 and 4), the actuator ring is disposed substantially in the plane of the cup lip and the fulcrum points are at the outer edge of the cup lip. In this position, the actuating force acts at a long moment arm and therefore at optimum mechanical advantage in overcoming the pressure of the oncoming air on the coned disk. The notches act through the medium of the ribs 15 to hold the actuator ring 18 against turning. As an alternative to bending the ribs adjacent their inner ends, the portion of the rubber surrounding the ribs and engaging the cup may be thickened or enlarged.

In accordance with another aspect of the invention, the actuator ring 18 is shifted back and forth axially by means which is readily accessible on the downstream end of the damper for coupling to a tool or other suitable actuator. Preferably this means comprises a shaft 35 extending along the duct axis and journaled intermediate its ends in a bearing 36 in the bottom 37 of the cup. Herein, a shoulder 38 on the shaft is held against the cup bottom by a snap ring 39. The end of the shaft projects beyond the cup bottom and, in this instance, is recessed as indicated at 40 or otherwise contoured to interfit with a suitable tool (not shown) by which the shaft may be turned.

Preferably, the rotary motion of the shaft 35 is converted into relative axial movement between the cup 28 and the ring 18 by a screw mechanism herein including a thread 41 formed on the shaft within the cup and extending somewhat beyond the open end thereof. The hub 19 of the umbrella is threaded onto the screw and is disposed within the cup (FIG. 2) when the umbrella is fully collapsed and the damper is fully opened. In this position, the nut thus formed is held positively against turning on the shaft as a result of the seating of the ribs in the notches 33 in the cup lip. In the damper open or folded condition of the umbrella (FIGS. 2 and 3), the nut is held against turning by virtue of the friction between the rubber covered ribs and the inside surface of the cup. By turning the shaft 35 in the proper direction, the nut 19 will be moved toward the end of the cup thus expanding the umbrella (FIG. 1) and progressively narrowing the width of the air passage 9 as the bends 31 ride upwardly and outwardly along the bottoms of the notches 33 in the lip of the cup 28. By the time the nut has been advanced somewhat beyond the lip of the cup, to a position limited by a stop in the form of a snap ring 43 on the screw, the disk 14 will have been expanded into full engagement with the duct wall 13 around its entire periphery as shown in FIGS. 4 and 10.

Now as the shaft is turned reversely and the nut 19 and the heads 20 on the ribs 15 are retracted into the cup, the ribs will be rocked about the cup lip and swung inwardly in radial planes toward the cup axis. The resulting inward bending of the rubber disk 14 in the planes of the ribs is accompanied by the formation of folds 44 (FIG. 3) in the segments of the disk between adjacent pairs of the ribs. This folding action is essentially the same as that which occurs during opening and closing of an ordinary umbrella.

With the apex or center of the umbrella pointing in the direction of flow of the air through the duct, it will be apparent that the oncoming air exerts on the dished surface of the disk 14 a force which is distributed uniformly and tends to open the umbrella. Thus, when the umbrella is expanded fully (FIG. 4), this axially directed force assists in bending the free edge portion of the disk as shown in FIG. 5 to establish and maintain full surface contact and effective sealing engagement between the rubber and the duct wall 13. The duct is closed tightly thus eliminating the noise which occurs in most prior dampers by the flow of air at high velocity through the cracks which remain when the damper is closed.

It is preferred that the ends 26 of the ribs 15 terminate short of the periphery of the disk to permit the sealing above described but close enough to engage the duct wall 13 in the event of excessive bending of the disk periphery. Such bending may be caused by an abnormal rise in the air pressure on the upstream side of the damper.

By properly shaping the flexible disk 14 and varying the lengths of the ribs 15, the damper above described may be adapted for use in ducts of non-circular cross section. For a square duct for example, a disk of corresponding shape would be used and the ribs 15 in the radial planes of the duct corners would be lengthened as shown in FIG. 9.

It will be apparent that a damper of a given size may be used in a relatively wide range of duct sizes. That is to say, for a duct smaller than that shown, the damper would become fully closed by lesser expansion of the disk 14. Of course, the duct should be small enough to permit effective sealing of the peripheral edge of the disk against the duct wall over the full circumference of the disk.

When the disk 14 is molded of rubber and therefore to an initial predetermined contour, it possesses some resiliency and thus tends to open, thereby assisting the pressure exerted by the air flowing through the duct and impinging on the dished side of the umbrella. When the umbrella is formed from die-cut disks of plastic or the like, the ribs 15 may be made of resilient wire and constructed and mounted so that the wire resiliency provides the desired assistance urging the umbrella open.

The damper constructed with the resilient ribs 15 and mounted in the duct as above described performs the additional function of an automatic regulator for maintaining a constant volume of the air flow through the duct. Thus, the resilient ribs 15 bend somewhat under the pressure of the oncoming air exerted on the partially open disk 14 and the extent of such bending and therefore the diameter of the disk increases and decreases with corresponding changes in this pressure. The expansion of the disk and the reduction in the area of the passage 9 is proportional to the increase in pressure thereby reducing the flow just enough to compensate for the pressure increase. Conversely, a decrease in the air pressure is accompanied by a reduction in the size of the disk and a corresponding increase in the area of the air passage and the volume rate of flow through the duct.

The overall cost of construction may be reduced and wider manufacturing tolerances allowed by employing the constructions of the type shown in FIGS. 10 to 17 in which the parts in common with the forms previously described bear corresponding reference numerals. These modifications are characterized by the coupling of the inverted frusto-conical disk or umbrella 14 to the cup 28 through the medium of a flange-like element 50 jointed to the disk at the fulcrum points or bends 31 of the ribs 15 and projecting axially from the apex of the disk. Preferably, the element 50 is a cylindrical sleeve formed integral with the disk during molding of the latter around the ribs 15 whose short inner and long outer portions 15ᵃ and 15ᵇ are bent more sharply in this instance to form bell-cranks with legs diverging upwardly at slightly more than a right angle relative to each other. As before, the wire ribs are embedded in the rubber of the disk which extends to and beyond the inner ends of the short legs 15ᵃ. The latter terminate within a continuous annular bead 51 preferably of circular cross section.

The sleeve 50 is nearly as long as the cup 28 and telescopes closely around substantially the full length of the latter which is cylindrical except for a shallow offset 52. Below the latter, the sleeve is seated in the curved portion of the crossbar 29 and, in the form shown in FIG. 10, is held against turning and axial displacement relative to the cup by an arcuate bar 54 clamped against the sleeve by screws 55 (FIG. 14). The sleeve thus supports the umbrella and holds the latter against turning.

The actuator ring or nut 18 is a cylinder formed near its upper end with a groove 56 in which the bead 51 at the inner edge of the conical disk 14 is disposed and is free to slide radially the short distance required for swinging of the bell cranks 15 between the damper closed and open positions shown in FIGS. 10 and 11. As before, the nut is threaded onto the screw 41 which is journaled in the cup bottom 37 and formed at its downstream end with a socket 40 for receiving a tool for turning the screw to open and close the damper. Upward movement of the nut is limited by a washer 57 loose on the upper end of the screw shaft beneath a crosspin 58.

With the umbrella thus constructed and mounted, the rubber at or immediately adjacent the junction of the upper end of the sleeve 50 and the bends 31 forms the hinge axes of the ribs 15. Thus, by yielding of the rubber above the upper end or lip 59 of the cup, the outer edge portion of the disk 14 will fold together as the rib legs 16ᵇ swing upwardly during downward swinging of the inner legs 15ᵃ by the nut 18. As shown in FIG. 11 and on an enlarged scale in FIG. 12, this swinging of the bell-cranks 15 is accompanied by some yielding and outward bulging of the rubber as indicated at 60 between the bends 31 and the cup lip 59. Also, there is a slight radial shifting of the bends 31 or fulcrums of the bell-cranks in order to accommodate the foreshortening of the legs 15ᵃ of the ribs which, in the expanded and contracted conditions of the flexible cone 14 shown in FIGS. 10 and 11, are angularly spaced equal distances above and below an axial plane including the fulcrums 31. Because of this, the variation in the moment arm of the actuating force over the full range of opening and closing of the damper is held at a minimum and the actuating force derived through the screw mechanism is utilized to optimum mechanical advantage.

Instead of using the clamp bar 54, the rubber sleeve 50 and the disk 14 integral therewith may be held down on the cup 28 by an inverted cup 67 (see FIG. 18) substituted for the washer 57 and having a downwardly flaring side wall. The latter terminates in a lip 66 disposed immediately above the bends 31 in the ribs 15 in the open position of the disk 14 as shown in FIG. 18. In the closed position, the side wall of the cup 67 lies adjacent the inner surface of the disk 14.

For certain installations, particularly those involving ducts of relatively large diameter, it is desirable for ease of operation to define the fulcrums of the ribs 15 more accurately. This is accomplished in the modification shown in FIGS. 16 and 17 in which the frusto-conical disk is, as in the form shown in FIG. 10, formed integral with a flange 50 telescoped with and clamped around the cup 28. In this modification, however, the lip 62 of the cup is extended somewhat above the inner peripheral edge of the disk 14. Inwardly beyond this edge which is spaced outwardly from the cup lip, the wire of the ribs 15 is left bare and bent in a special way, not only to positively define the fulcrums of the umbrella ribs but also to utilize the actuating force to best advantage in collapsing the umbrella from its wide open position shown in FIG. 16.

To the foregoing ends, the bared inner end portions 15ᵃ of the rib wires 15 are bent upwardly at the inner edge of the rubber disk 14 and then downwardly to form V's 63 which open toward the sleeve 50. These V's straddle the lip 62 of the cup 28 and bear downwardly against the latter at their apices thereby accurately locating the fulcrums of the swinging ribs 15.

In order that the actuating force derived through the nut 18 and the screw 14 may be used to best mechanical advantage when the disk 14 is fully expanded and subject to maximum air pressure, the inner end portions 64 of the ribs beyond the V's 63 are bent toward the latter and disposed substantially at right angles to the ribs proper. At their ends 65, the wires are bent laterally and substantially at right angles to the portions 64 for pivotal and slidable coupling to a flange on the upper end of the nut 18. Herein, this flange is formed by an apertured disk 66 pressed onto the shouldered upper end of the nut and having a peripheral flange 67 turned downwardly against a disk 68 pressed onto the nut against a larger shoulder thereon and slotted radially at 69 to receive the upturned ends 64 of the ribs. The enlargements 65 are thus connected pivotally to the nut while being free to slide radially as permitted by the slots 69.

With this right angular shape of the ribs, the inner legs 64 of all of the wires will be disposed substantially in a common axial plane when the outer legs of the ribs project along the disk axis as shown in phantom in FIG. 16 when the umbrella is closed and the damper full open. On the other hand, when the umbrella is expanded and the duct fully closed as shown in FIG. 16, the inner end portions 64 of the ribs project upwardly and generally parallel to the cup axis.

The expanding cone damper in the various forms above described possesses numerous structural, functional and economic advantages. It is especially adapted for round ducts but is usable in ducts of any cross sectional shape, and one size of cone will accommodate a relatively wide range of duct sizes. By pointing the apex of the cone downstream, the pressure of the oncoming air urges the damper open, and the air stream, after passing the restricted annular opening 9, naturally follows along the converging surface of the cone and thus expands radially and becomes distributed quickly over the full area of the duct rather than to retain its annular shape and hug the duct wall. For this same reason, the noise incident to flow of the air stream past the damper when partially open is substantially less than with prior dampers particularly those of the butterfly type most commonly used in round ducts.

The damper is easily mountable simply by attaching the ends of the bracket 29 to the duct wall with no other framing necessary. The entire damper may be rust-proofed by making the parts supporting the rubber disk from corrosion-resistant materials.

Adjustment of the simple screw and nut is easily made from the outlet end of the duct. Close tolerances in the manufacture of the parts are not required especially with the disk 14 yieldably mounted as in the preferred forms shown in FIGS. 10 and 16.

The automatic action of the resiliently expansible and contractible cone to regulate the volume flow through the duct is another advantage inherent in the ribbed construction of the improved damper.

Of primary importance is the low overall cost of manufacture. The metal parts may be formed by high production methods and the umbrella proper is made of low cost rubber in a single molding operation.

This application is a continuation-in-part of my co-pending application Ser. No. 728,416, filed April 14, 1958, now abandoned.

I claim as my invention:

1. The combination of, a duct adapted for the flow of air therethrough, an umbrella disposed within said duct with its axis extending longitudinally of the duct, a member mounted within said duct and supporting said umbrella for radial collapse and expansion, the outer peripheral edge of the umbrella corresponding in shape to the cross-sectional shape of said duct and being sealed against the wall of said duct when the umbrella is fully expanded and cooperating with said wall when the umbrella is partially collapsed to form a continuous air passage extending around the umbrella between said edge and said wall, and actuating means mounted on said member and movable relative thereto to open and close said umbrella and thereby correspondingly vary the area of said air passage.

2. The combination of, a duct adapted for the flow of air therethrough, a support disposed within and secured to said duct, an expansible and collapsible umbrella disposed within said duct with its axis extending longitudinally of the duct, the outer periphery of said umbrella cooperating with the duct wall to form an air pasage, angularly spaced ribs secured to and reinforcing said umbrella, means on said support mounting said ribs to turn about individual tangentially disposed axes spaced outwardly from the longitudinal axis of said duct and disposed intermediate the ends of the said ribs, and actuating means mounted on said support pivotally coupled to the inner ends of said ribs and movable relative to said support to swing said ribs about said axes to open and close said umbrella and correspondingly vary the radial width of said passage.

3. The combination of, a duct, a disk of flexible material having a peripheral shape matching the contour of the internal wall of the duct, a ring substantially smaller in diameter than said duct and stationarily mounted within the latter concentric with the longitudinal axis thereof, a plurality of ribs secured to and angularly spaced around said disk and radiating from the central portion thereof to form an umbrella cooperating with said duct wall to define an annular passage variable in width by opening and closing the umbrella, each of said ribs being fulcrumed on said ring short of its inner end, a member pivotally coupled at angularly spaced points to the inner ends of each of said ribs, and means supporting said ring and said member for relative axial movement in opposite directions to rock said ribs in radial planes and respectively expand and collapse said umbrella.

4. The combination of, a duct, a ring disposed within the duct in alinement with the longitudinal axis thereof, a screw shaft projecting axially through and journaled on said ring, a nut threaded onto said shaft and movable axially of the ring in response to turning of the shaft in opposite directions, a plurality of ribs angularly spaced around said axis and radiating therefrom, each of said ribs being fulcrumed intermediate their ends on said ring for swinging about tangentially disposed axes, means pivotally coupling the inner ends of said ribs to said nut, a bracket rigid with the wall of said duct and supporting said ring within the duct, and a disk of flexible material secured to said ribs and forming therewith an umbrella having a fold between each pair of adjacent ribs.

5. The combination of, a duct adapted for the flow of gas therethrough, a support disposed within the duct and secured to the wall thereof, an umbrella apertured at its center and mounted on said support for expansion and collapse to vary the area of the continuous peripheral passage defined by the duct wall and the outer peripheral edge of the umbrella, and actuating means for opening and closing the umbrella within the duct, said actuating means comprising a screw shaft journaled on said support to turn about the umbrella axis and a nut mating with the thread of said screw shaft and coupled to the inner peripheral edge of the umbrella.

6. An air damper as defined by claim 5 in which the apex of the umbrella projects in the direction of flow of the gas through said duct and said screw shaft projects downstream beyond said apex.

7. The combination of, a duct adapted for the flow of a stream of air therethrough in a predetermined direction, a support disposed within said duct, an expansible and collapsible umbrella of conical shape disposed within said duct with its axis extending longitudinally of the duct and the outer peripheral edge of the umbrella facing upstream, and actuating means mounted on said support and movable relative thereto to open and close said umbrella and thereby vary the radial width of the air passage between said edge and the duct wall, the force of said air stream assisting said actuating means in urging said umbrella open.

8. The combination of, a duct of non-circular cross-section, a disk of flexible material having a peripheral shape matching the contour of the internal wall of said duct, a member substantially smaller than said duct, means supporting said member in centered position within said duct, a plurality of ribs secured to and angularly spaced around said disk and radiating from the central portion thereof to form an umbrella, each of said ribs being fulcrumed intermediate its ends on said member to swing about a tangentially disposed axis, and means movable longitudinally of said duct and coupled to the inner ends of said ribs for swinging said ribs in unison in opposite directions about their respective axes to respectively expand and collapse said umbrella, each of said ribs being of a length corresponding to the radius of the duct in the plane of such rib whereby the free ends of all of the ribs come against the duct wall substantially simultaneously as said umbrella is expanded.

9. The combination of, a duct, a disk of flexible material having a peripheral shape matching the contour of the internal wall of the duct, a ring substantially smaller in diameter than said duct and disposed within the latter concentric with the longitudinal axis thereof, a plurality of ribs secured to and angularly spaced around said disk and radiating from the central portion thereof to form an umbrella cooperating with said duct wall to define an annular passage variable in width by opening and closing the umbrella, said ribs projecting radially across and bearing against said ring to define tangentially extending fulcrum axes disposed short of the inner ends of the ribs, a member pivotally coupled to the inner ends of said ribs, and means supporting said ring and said member for relative axial movement in opposite directions to rock said ribs in radial planes and thereby expand or collapse said umbrella.

10. A flow regulator as defined in claim 9 in which said ring has an outwardly flaring flange at one end bearing against said ribs to define tangentially disposed fulcrums which shift inwardly and outwardly during the rocking of said ribs in opposite directions.

11. The combination of, a frusto-conical disk of flexible material, a ring substantially smaller in diameter than said disk, a plurality of ribs secured to and angularly spaced around said disk and radiating from the central portion thereof to form an umbrella, a flange-like element composed of flexible material concentric with the axis of said disk and projecting from the disk intermediate the ends of said ribs, said element being secured to said ring and defining tangentially extending fulcrums for said ribs intermediate the ends of the latter, a member pivotally coupled to the inner ends of said ribs, and means supporting said ring and said member for relative axial movement to expand and collapse said umbrella.

12. The combination of, a duct adapted for the flow of gas therethrough in one direction, a support within said duct, an expansible and contractible conical disk disposed within said duct and cooperating at its peripheral edge with the duct wall to define a passage variable in area with the changes in the size of said disk, the apex of said disk projecting downstream so that the pressure of the air on the disk flowing in said one direction tends to expand the latter, and angularly spaced radially disposed ribs of resilient material reinforcing said disk and mounted on said support to swing about tangentially disposed axes spaced outwardly from the duct axis, manually operable means for swinging said ribs about said axes to adjust the size of said disk and correspondingly change the areas of said passage, said ribs being composed of resilient material and bendable differentially with changes in said pressure whereby to vary the area of said passage inversely with and in proportion to such pressure changes.

References Cited in the file of this patent
UNITED STATES PATENTS

| | | |
|---|---|---|
| 2,617,437 | Sherman | Nov. 11, 1952 |
| 2,783,702 | O'Day | Mar. 5, 1957 |
| 2,890,716 | Werder | June 16, 1959 |